United States Patent [19]

Nickel

[11] 4,297,278
[45] Oct. 27, 1981

[54] PENTAKIS-AND HEPTAKIS-AZOXY DYESTUFFS

[75] Inventor: Horst Nickel, Leverkusen, Fed. Rep. of Germany

[73] Assignee: Bayer Aktiengesellschaft, Leverkusen, Fed. Rep. of Germany

[21] Appl. No.: 128,201

[22] Filed: Mar. 7, 1980

[30] Foreign Application Priority Data

Mar. 16, 1979 [DE] Fed. Rep. of Germany ....... 2910458

[51] Int. Cl.³ .................... C09B 57/00; C07C 105/00; D06P 3/24; D06P 3/32
[52] U.S. Cl. .................................... 260/143; 260/144; 260/172; 260/178; 260/183; 260/186; 260/190; 260/191; 260/198
[58] Field of Search ........................ 260/143, 198, 144

[56] References Cited

U.S. PATENT DOCUMENTS

| | | | |
|---|---|---|---|
| 2,004,250 | 6/1935 | Schindhelm et al. ................ | 260/143 |
| 2,314,023 | 3/1943 | Straub et al. ......................... | 260/143 |
| 3,575,954 | 4/1971 | Jirou et al. ........................... | 260/157 |
| 4,141,889 | 2/1979 | Allan .................................... | 260/144 |

FOREIGN PATENT DOCUMENTS

| | | | |
|---|---|---|---|
| 512896 | 5/1955 | Canada ................................ | 260/143 |
| 738309 | 10/1955 | United Kingdom ................ | 260/143 |

OTHER PUBLICATIONS

Gawlowski et al., Chemical Abstracts, vol. 91, #6386f, (1979).

*Primary Examiner*—Floyd D. Higel
*Attorney, Agent, or Firm*—Sprung, Felfe, Horn, Lynch & Kramer

[57] ABSTRACT

Polyazo dyestuffs of the formula

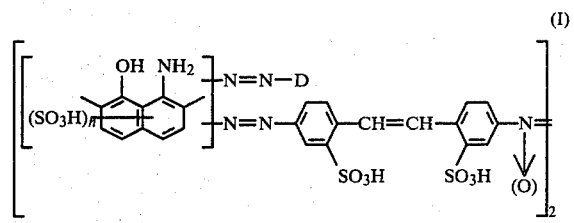

wherein
  D denotes the radical of a diazo component and
  n denotes the number 1 or 2, and their use for dyeing and printing fibre materials containing amino groups or hydroxyl groups, and leather. The resulting dyeings have good properties under wet conditions and when in use.

4 Claims, No Drawings

PENTAKIS-AND HEPTAKIS-AZOXY DYESTUFFS

The present invention relates to new polyazo dyestuffs of the formula

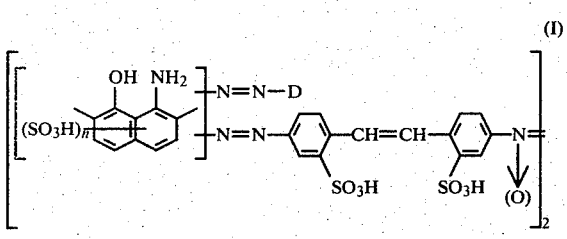
(I)

in particular those of the formulae

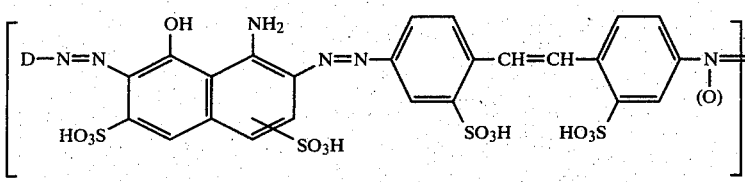
(II)

and

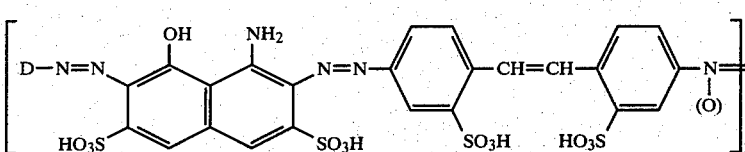
(III)

wherein
D denotes the radical of a diazo component and n denotes 1 or 2.

The radical D can be aromatic-carbocyclic or aromatic-heterocyclic. Preferred radicals are those of the benzene and naphthalene series and can contain the customary substituents. The following substituents may be mentioned as examples: $C_1$-$C_4$-alkyl, $C_1$-$C_4$-alkoxy, halogen, in particular Cl and Br, sulpho, carboxyl, carboxylic acid amide and sulphonic acid amide (in particular the mono- or di-$C_1$-$C_4$-alkylamides or the mono-arylamides), sulphonamide, in particular alkyl- and aryl-sulphonylaminosulphonyl, amino, nitro, acylamino, in particular $C_1$-$C_6$-alkylcarbonylamino and arylcarbonylamino, and the corresponding sulphonyl radicals, and azo groups, in particular —N=N—R groups in which R=aryl (in particular optionally substituted phenyl or naphthyl).

The dyestuffs can be prepared by known processes. The following processes may be mentioned as examples:

A. Reductive linking of 2 molecules

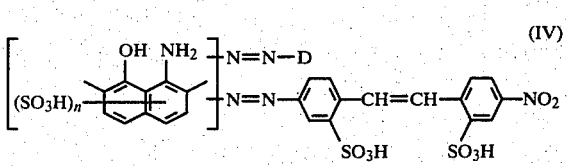
(IV)

The invention also relates to the compounds (IV).

The reduction is effected in a known manner, for example by treating the nitro compound IV with weak reducing agents, preferably glucose or hydrazine, in a strongly alkaline medium, preferably a medium rendered alkaline with 2-5% of sodium hydroxide, at temperatures from 40° to 90° C., preferably at 50°-80° C., if appropriate in the presence of reduction promoters, such as naphthoquinones. The reaction generally leads to a mixture of varying proportions of the azo and/or azoxy compounds

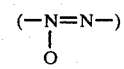

(see also Houben Weyl X/3, pages 346-349, Georg Thieme Verlag, Stuttgart, 1965).

The compounds (IV) are prepared, for example, by acid coupling of diazotised

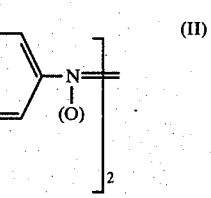
(V)

to

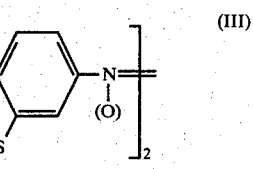
(VI)

to give

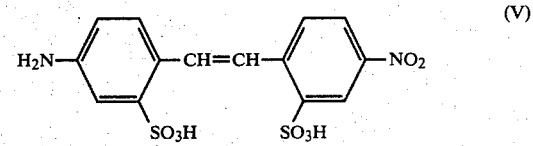
(VII)

and subsequent alkaline coupling of (VII) with diazotised amines

D—$NH_2$ (VIII)

to give

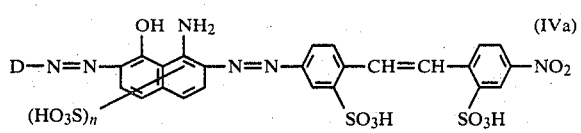

The invention also relates to the compounds (VII).
Another process is as follows:

The compound (V) is diazotised and the diazotisation product is coupled to azo dyestuffs

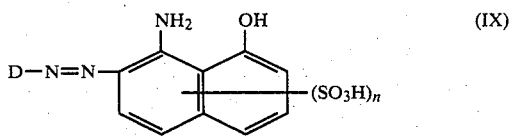

prepared by acid coupling, to give

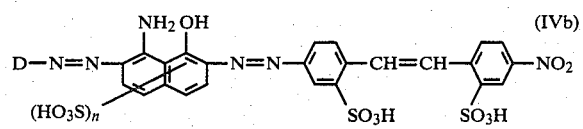

(B) Tetrazotisation of

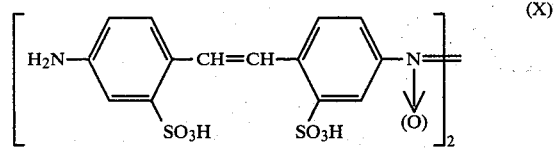

obtained by reductive linkage of two molecules (V), acid coupling of the tetrazotisation product to (VI) to give

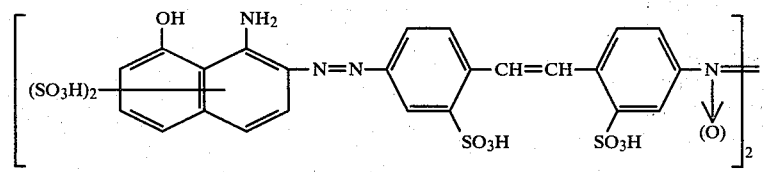

and alkaline coupling of this compound with 2 mols of diazotised (VIII), or reductive linkage of 2 mols of VII to give XI and alkaline coupling of XI to give 2 mols of diazotised VIII.

The invention also relates to the compounds (XI).

Possible 1-amino-8-hydroxynaphthalenesulphonic acids (VI) are: the 4- or 5-monosulphonic acid, the 3,5- or 4,6-disulphonic acid and, preferably, the 3,6-disulphonic acid (H-acid).

Examples of suitable compounds (VIII) which may be mentioned are: aniline, 3- or 4-toluidine, 2-, 3- or 4-methoxyaniline, 2-, 3- or 4-monochloro- or 2,5- or 3,4-dichloro-aniline, 3- or 4-aniline-sulphonic acid, 2-, 3- or 4-amino-benzoic acid, sulphanilamide, 4-aminoazobenzene, 4-aminoazobenzene-4'-sulphonic acid, 3-methoxy-4-aminoazobenzene-3'-sulphonic acid, 4-acylaminoaniline (acyl=formyl, acetyl, Cl-acetyl, propionyl, benzoyl, tosyl or benzenesulphonyl), 2,5-dichloroaniline-4-sulphonic acid, 2-methoxyaniline-4-sulphonic acid, dehydrothiotoluidine and its monosulphonic acid, 1-aminonaphthalene, 1-aminonaphthalene-4-, -5-, -6- or -7-monosulphonic acid, 2-aminonaphthalene-5- or -6-sulphonic acid, 3- or 4-nitroaniline and 4-nitroaniline-2-sulphonic acid.

The new dyestuffs I–IV, VII and XI are suitable for dyeing and printing fibre materials containing amino groups or hydroxyl groups, and leather. The dyestuffs I, II and III are particularly suitable for dyeing cellulose materials, preferably cotton, regenerated materials and paper. The dyestuffs are readily soluble and are generally virtually insensitive to hard water.

The dyeings, for example on cellulose, have good properties under wet conditions and when in use and are stable during crease-proofing of the materials and during after-treatment with cationic auxiliaries to improve the fastness to wet processing.

Dyestuffs of the formula XI are suitable for dyeing cellulose materials and can be after-treated on the fibre with diazotised amines (VIII).

Dyestuffs of the formula IV are preferably suitable for dyeing leather and paper by the customary dyeing processes.

Dyestuffs of the formula VII are preferably suitable for dyeing and printing materials containing amide groups, such as silk, wool or polyamides; the dyeings and prints can then be coupled with diazonium compounds.

The dyestuffs are preferably used in the form of their salts or salt mixtures (sodium, potassium, ammonium and lithium salts), but in principle it is also possible to use them in the form of a concentrated dyestuff solution, for example in water-miscible organic solvents, if appropriate mixed with water or in water and if appropriate in the presence of solubilising agents, such as, for example, urea.

EXAMPLE 1

42.2 parts (0.1 mol) of the monosodium salt of 4'-nitro-4-aminostilbene-2,2'-disulphonic acid are dissolved in 350 parts of water at 80° C., under neutral conditions, and are diazotised indirectly with 23 parts of 30% strength sodium nitrite solution at room temperature in the customary manner. When the diazotisation reaction has ended, excess nitrous acid is destroyed with amidosulphonic acid.

34.1 parts (0.1 mol) of the monosodium salt of 1-amino-8-hydroxynaphthalene-3,6-disulphonic acid (H-acid) are dissolved in about 60 parts of water with about 9 parts of 40% strength sodium hydroxide solution at room temperature and the solution is then acidified with 6 parts of 28% strength hydrochloric acid, whereupon most of the H-acid precipitates. This H-acid suspension is combined with the above diazonium salt mixture and a pH value of 2.5 to 3 is maintained, by dropwise addition of about 180 parts of 10% strength sodium bicarbonate solution, until the acid coupling of the H-acid has ended. (1st stage).

A diazonium salt solution of 19.7 parts (0.1 mol) of 4-aminoazobenzene is added to the resulting coupling solution. The diazonium salt solution is prepared in the customary manner by direct diazotisation of the aminoazobenzene in about 400 parts of water and 35 parts of 28% strength hydrochloric acid with about 25 parts of 30% strength sodium nitrite solution at 0° C.

In order to carry out the coupling reaction, about 230 parts of 20% strength sodium carbonate solution are added dropwise (pH 9 to 9.5) and the mixture is stirred until the coupling reaction in the second stage has ended.

To join the molecules by reduction, 120 parts of 40% strength sodium hydroxide solution are added to the resulting dyestuff solution, the mixture is warmed to 70° C. and a solution of 12 parts of glucose in 40 parts of water is added. The mixture is stirred at 70° C. for 30 minutes, until the condensation reaction has ended.

The resulting dyestuff is salted out with sodium chloride, isolated and dried, in the customary manner.

The dried dyestuff is a dark powder which dissolves in water giving a dark green-coloured solution and dyes cotton in dark green shades.

If, instead of the 4-aminoazobenzene, an equimolar amount of aniline, 4-acetylaminoaniline, 4-methoxyaniline, 2,5-dichloroaniline, 3- or 4-anilinesulphonic acid, 4-aminoazobenzene-4'-sulphonic acid or dehydrothiotoluidinesulphonic acid is used as the diazo component, after the coupling reaction and after joining the two molecules by reduction, dyestuffs which dissolve in water giving dark green-coloured solutions and which dye cotton dark green are obtained.

EXAMPLE 2

42.2 parts (0.1 mol) of the monosodium salt of 4'-nitro-4-aminostilbene-2,2'-disulphonic acid are diazotised, and the diazotisation product is coupled with 0.1 mol of H-acid under acid conditions to give the o-aminoazo dyestuff, as described in Example 1 (stage 1).

The resulting dyestuff solution is now treated with 3% of its volume of 40% strength sodium hydroxide solution and the mixture is heated to 65° C. and stirred with a solution of 12 parts of glucose in 40 parts of water at 70° C. for 30 minutes, until the joining of the molecules by reduction has ended.

This dyestuff intermediate product is salted out with sodium chloride and isolated, in the customary manner.

The resulting paste of the dyestuff intermediate product is dissolved in about 1,500 parts of water and, after adding 140 parts of 20% strength sodium carbonate solution, the mixture is combined with a diazonium salt solution obtained from 0.1 mol of 4-nitroaniline. When the coupling reaction has ended, the dyestuff is isolated with sodium chloride and dried. It is a dark powder which dissolves in water giving a green-coloured solution. Cotton is dyed in dark green shades.

If, instead of the diazonium salt solution obtained from 4-nitroaniline, a diazonium salt solution obtained from aniline, 3-nitroaniline, 3-chloroaniline, 4-methylaniline, 4-nitroaniline-2-sulphonic acid, 4-aminodiphenylamine-2-sulphonic acid, 4-amino-2'- or -4'-methoxy-diphenylamine-2-sulphonic acid is used, dyestuffs which dye cotton in dark green shades are obtained.

EXAMPLE 3

If 1-amino-8-hydroxynaphthalene-4,6-disulphonic acid is used as the aminohydroxynaphthalenesulphonic acid coupling component instead of 1-amino-8-hydroxynaphthalene-3,6-disulphonic acid (H-acid) and the procedure followed is analogous to that described in Example 1 or 2, dyestuffs which dye cotton in dark green shades are obtained.

EXAMPLE 4

If 1-amino-8-hydroxynaphthalene-4-sulphonic acid is used as the coupling component, a procedure analogous to that described in Examples 1 or 2 gives dyestuffs which dye cotton in dark green to black-green shades.

EXAMPLE 5

0.1 mol of the monoazo dyesuff [aniline→H-acid] is dissolved in 700 parts of water under neutral conditions and is coupled, under alkaline conditions obtained with sodium carbonate, and at room temperature, with 0.1 mol of the diazonium compound of 4'-nitro-4-aminostilbene-2,2'-disulphonic acid, prepared according to the statement of Example 1. The diazo dyestuff precipitates and is isolated. To join the molecules by reduction, the paste is stirred into 800 parts of water, 3% of the volume of the mixture of 40% strength sodium hydroxide solution is added and the mixture is treated with a solution of 11 parts of glucose in 40 parts of water at 65° C. for 30 minutes. The resulting dyestuff is isolated with sodium chloride and dried. The dried dyestuff is a dark powder which dissoles in water giving a blue-green coloured solution and dyes cotton in blue-green shades.

If, instead of 0.1 mol of the dyestuff aniline $$\xrightarrow{a}$$

H-acid, an equimolar amount of the dyestuff 2,5-dichloroaniline $\xrightarrow{a}$ H—acid (1), p-nitroaniline $\xrightarrow{a}$ H—acid (2) or 4-aminoaniline $\xrightarrow{a}$ H—acid (3) is used as the coupling component, a procedure analogous to that above gives (1) a blue-green, (2) a black-green or (3) a blue-green dyestuff (a=acid coupling).

I claim:

1. A polyazo dyestuff of the formula

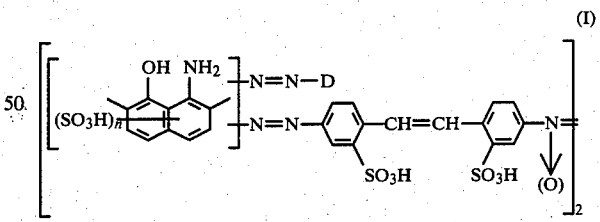

(I)

wherein
D denotes the radical of a diazo component and
n denotes 1 or 2.

2. A polyazo dyestuff of the formula

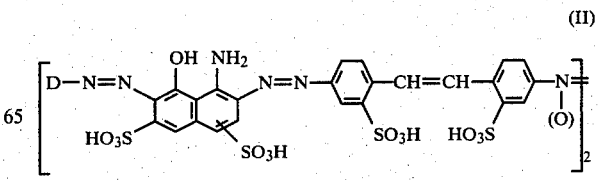

(II)

wherein
D denotes the radical of a diazo component and
n denotes 1 or 2.
3. A polyazo dystuff of the formula
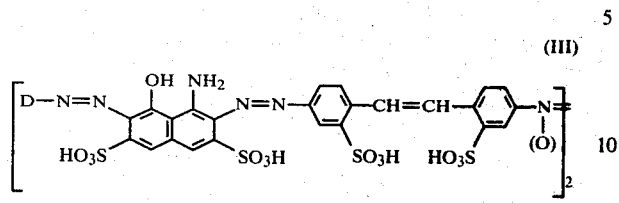
(III)
wherein
D denotes the radical of a diazo component and
n denotes 1 or 2.
4. A polyazo dyestuff of the formula
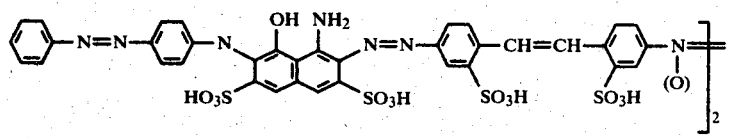
* * * * *